Nov. 6, 1973     L. E. HENNESSY ET AL     3,770,662

FOAMED ELASTOMERIC PRODUCT AND METHOD OF MAKING THE SAME

Filed May 10, 1971

INVENTORS.
LEO E. HENNESSY
JOHN A. MORRIS, III
BY.
Oberlin, Maky, Donnelly & Renner
ATTORNEYS

United States Patent Office 3,770,662
Patented Nov. 6, 1973

3,770,662
FOAMED ELASTOMERIC PRODUCT AND METHOD OF MAKING THE SAME
Leo E. Hennessy, Chagrin Falls, and John A. Morris III, Streetsboro, Ohio, assignors to Industrial Electronic Rubber Company, Twinsburg, Ohio
Filed May 10, 1971, Ser. No. 141,706
Int. Cl. C08d 13/10; C08f 47/10, 29/16
U.S. Cl. 260—2.5 S
12 Claims

ABSTRACT OF THE DISCLOSURE

A fluoroelastomeric article is extruded or otherwise molded, and cured, and subsequently blown to produce an enlarged foamed elastomeric product of predetermined conformation.

BACKGROUND OF THE INVENTION

Foamed elastomeric products have long been known in the art and have generally been produced by blowing the elastomeric material in a mold and subsequently at least partially curing the resultant article prior to removal from the mold. Similarly, foamed elongated elastomeric elements such as sealing strips and the like have been produced by extruding elastomeric materials through dies, and activating a blowing agent to foam the article, which is thereafter cured. Such operations have, of course, required employment of blowing agents which become effective at lower temperatures than the curing or cross-linking agents.

SUMMARY OF THE INVENTION

A principal object of the present invention is to produce an elastomeric article which is first cured to elastically distensible resiliently deformable condition and the dimensions of which are subsequently expanded by production of a multitude of cells therein.

A further object is to provide such article having an outer imperforate skin.

Another object is to provide an inexpensive method of producing such article having desired conformation and proportions.

Other objects of the invention will appear as the description proceeds.

To the accomplishment of the foregoing and related ends, the invention, then, comprises the features hereinafter fully described, the following description and the annexed drawings setting forth in detail certain illustrative embodiments of the invention, these being indicative, however, of but a few of the various ways in which the principle of the invention may be employed.

Figure 1:
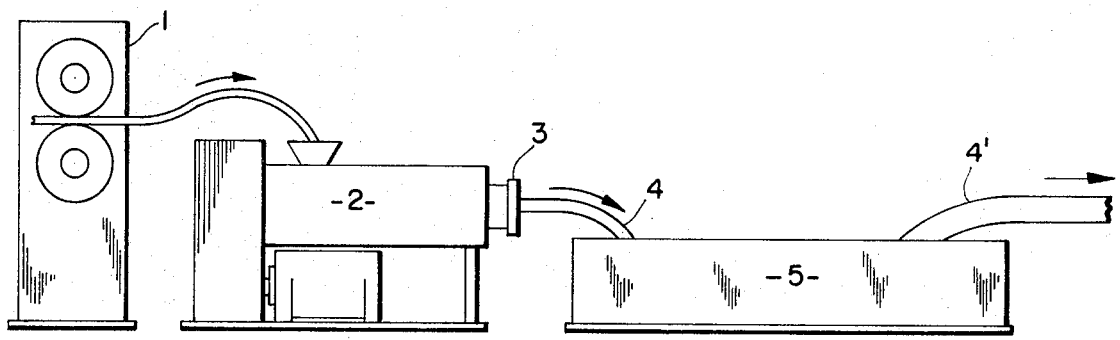
Figures 2, 3:
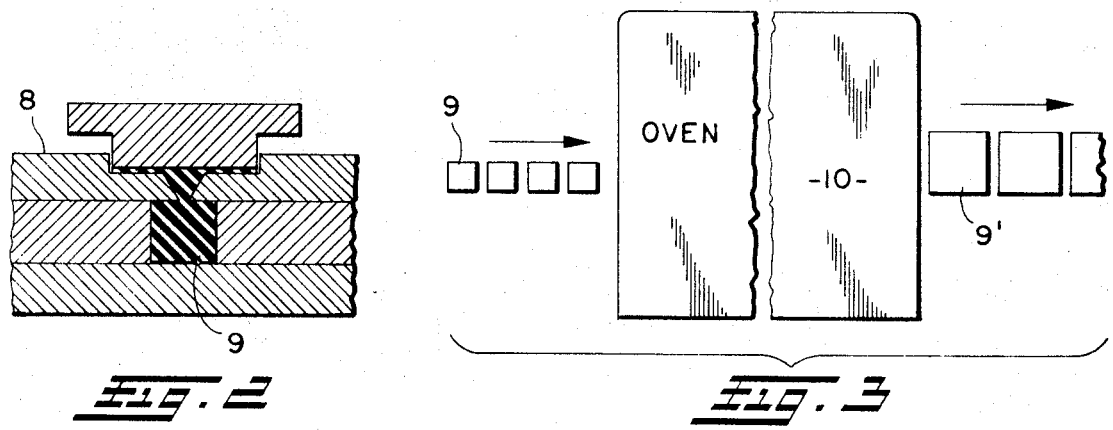
Figure 4:
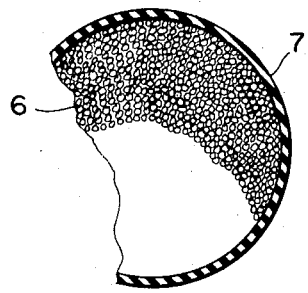
Figure 5:
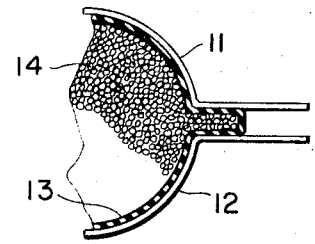

In said annexed drawings:

FIG. 1 is a flow diagram illustrating one method of producing the new article;

FIGS. 2 and 3 together illustrate another method of producing the new article;

FIG. 4 is a fragmentary much enlarged view in cross-section taken through one such article; and FIG. 5 is a fragmentary cross-setcional view of two opposed flanges having the product of my invention actively expanded therebetween.

The uncured elastomeric material may be mixed with a blowing agent and a curing agent on a two roll rubber mill (FIG. 1), together with such other materials as fillers, extenders, plasticizers and the like as may be needed or desired. The blowing agent will be selected of a type which is activated only at a temperature substantially higher than that effective to activate the curing agent. Following molding as by extrusion through a die to shape the cross-section of the molded article the latter may be cut into lengths and placed in a hot oil bath at blowing temperature for a period of time sufficient progressively to cure such article from the exterior thereof to the center with blowing following the cure as the heat gradually penetrates the article. The over-all size of the article may thereby be greatly increased in all directions (including length), while quite accurately retaining the conformation and proportions of the original pre-formed molded article. Such blowing may take place without physical external restriction, and the article normally forms an external imperforate skin. The entire enlarged article may thus be produced in elastically distensible resiliently deformable condition, with gas under some pressure in the closed cells actively distending the walls of the latter.

Alternatively, the extruded uncured article may be passed through a first hot oil bath or oven at curing temperature to effect a pre-cure prior to passage through a second bath or oven at the substantially higher blowing temperature to effect the blow. It is ordinarily important that the cure and the blow be thus achieved at distinctly different temperatures without partial premature activation of the blowing agent at the lower curing temperature.

As illustrated in FIGS. 2 and 3 of the drawing, the articles may also be molded and cured in a conventional transfer mold and thereafter blown by heating to blowing temperature in an oven or the like. Depending on the particular composition involved, dielectric heating, micro-wave ovens, infra-red ovens, and various heating baths may be employed. It is found that an imperforate surface or skin is ordinarily produced which is not only visually attractive but also usually functionally desirable in such articles as O-rings and the like. The molded proportions and conformation of the final product closely follow those of the original smaller molded shape, being superior in this respect to prior art elastomeric products which have, for example, been extruded, then foamed in the open, and thereafter cured.

DESCRIPTION OF THE INVENTION

The invention is particularly applicable to fluoroelastomers formulated in such manner that the end product is a sponge which can be produced by pre-curing the material at a temperature below the decomposition temperature of the blowing agent (e.g. pp'-oxybis (benzenesulfonylhydrazide), or azodicarbonamide, or other like nitrogen producing chemical), followed by blowing and expansion at a higher temperature. Sheets, rods, tubes, complex gasket shapes, O-rings, and general mechanical goods can be made in this manner. Ordinarily, viscosity adjusting plasticizers will be employed together with cross-linking organic peroxides (e.g. benzoyl peroxide, 2,4-dichlorobenzoyl peroxide, lauroyl peroxide, methyl ethyl ketone peroxide) and bifunctional cross-linking agents (e.g. ethylene dimethacrylate, 1,3-butylene glycol dimethacrylate, trimethylol propane trimethacrylate).

Thus, in formulating elastomeric compositions in accordance with this invention, materials such as the following may desirably first be compounded together:

|  | Parts by weight | |
|---|---|---|
|  | General | Preferred |
| Fluoroelastomer (fluorel 2140, Viton A)[1] | 100.0 | 100.0 |
| Acid acceptors (e.g., ZnO, MgO, PbO)[2] | 10-20 | 15.0 |
| Filler (e.g. CaCo₃, Ca silicate, SiO₂) | 0-50 | 15.0 |
| Plasticizer-polymeric oil, halogenated fluids [2] | 5-25 | 20.0 |
| Bifunctional cross linking agent [3] | 1-20 | 2.0 |
| Cross linking peroxide [4] | 2-7 | 5.0 |
| Blowing agent [5] | .5-4 | 2.0 |

[1] Hexafluoropropylene—vinylidene fluoride copolymers, chlorotrifluoroethylene and vinylidene fluoride copolymers, fluorosilicone, and other modified fluoroelastomers.
[2] Polymer of trifluorovinyl chloride is preferred (FS-5 from Hooker Chemical Corp.).
[3] Trimethylol propane trimethacrylate is preferred. (Sartomer Resins SR-350).
[4] Benzoyl peroxide is preferred.
[5] p,p'-Oxybis (benzenesulfonyl-hydrazide) is preferred. Celogen OT)

The several ingredients may first be mixed in the normal manner on a two roll rubber mill such as 1, for example, with the resultant blend comprising a stiff, plastic material which can easily be formed under heat and pressure. It may then be fed to an extruder 2 from which it is extruded through a die 3 of desired cross-section to produce a continuous elongated article 4. This article may be continuously fed into a hot oil bath in a trough 5 which may, for example, be about five feet long and four inches wide, the oil being maintained at about 300° F. by electric heaters. Such article will ordinarily be fed through the bath at such rate that it spends approximately three minutes in the oil bath, and it may desirably be cut into twenty foot lengths to facilitate handling. Upon withdrawal from the bath the article 4' may now be as much as one and one-half times its former cross-sectional area and one and one-half times its original length. Consequently, the density of the article may be approximately one-quarter that of the original solid extrusion. It comprises a soft closed cell sponge 6 with a continuous external skin 7 (FIG. 4). Instead of an oil bath, various other liquid curing media may be utilized such as molten salt and certain molten metals, and fluidized bed and hot oven techniques are also satisfactory. Infrared and high frequency heating means may likewise be utilized.

Alternatively, a piece of the milled material may be formed under pressure (e.g. 1000 p.s.i.) and heat (preferably about 240° F.) for three minutes in a typical rubber transfer mold 8 (FIG. 2). The resultant article 9, upon removal from the mold, is in the shape of the mold cavity and appears as a vulcanized part, being somewhat resilient, solid, and exhibiting no cold properties. Such molded article is now placed in an oven 10 at about 300° F. for about one-half hour. Upon removal, the article 9' may now be nearly four times its original volume and one-quarter its original density, with a continuous skin ordinarily appearing over its entire surface. The interior of the article is comprised of a very large number of small individual cells forming a typical closed cell sponge.

A particular preferred embodiment of the invention is as follows. The following listed ingredients are first thoroughly mixed and blended together:

|  | Parts by weight |
|---|---|
| Viton A (hexafluoropropylene-vinylidene fluoride copolymer, E. I. du Pont) | 100.0 |
| Maglite D (magnesium oxide—Merck) | 15.0 |
| Silene D (amorphous silica—Pittsburg Plate Glass) | 17.6 |
| FS-5 (polymer of trifluorovinyl chloride—Hooker Chemical) | 20.0 |
| SR-350 (trimethylol propane trimethacrylate—Sartomer Resins, Inc.) | 2.0 |
| Celogen OT (p,p'-oxybis (benzenesulfonylhydrazide)—Naugatuck Chemical) | 0.5 |
| Benzoyl Peroxide, 96% (Lucidol or Cadet Chemical) | 5.0 |

The mixing is done on a two roll rubber mill at a temperature well below the curing and blowing temperatures and the resultant compound is molded in a transfer mold with the mold and press being maintained at 220° F. A molding pressure of 2000 p.s.i. is employed and the cure time under these conditions is eight minutes. The product removed from the mold is a semi-cured solid part of the exact size and shape of the mold cavity. Such part is then placed in a forced-air oven at 300° F. for one-half hour to activate the blowing agent and is expanded in all directions; each dimension is thereby increased about 60%, or the volume is increased about four times.

The same milled composition may alternatively be extruded into a rod-like extrusion one-quarter inch in diameter, in completely uncured condition. Such extrusion is then fed into a liquid bath (e.g. oil) maintained at 300° F. progressively to cure and blow the same. After four minutes in the bath it is removed as an expanded cellular article having a diameter about 50% greater than the original extruded diameter and a correspondingly increased length, the volume being about quadrupled.

The molded pre-cured elastomeric article may be placed within a rigid container or shell, or between two opposed metal flanges such as 11 and 12 (FIG. 5), and then expanded by blowing therebetween not only to fill the space but also actively to press against the inner surfaces thereof. A skin 13 is formed which engages the metal surfaces, with closed cells 14 supporting the same.

In the past, when blowing an uncured elastomeric article in the open, it has been difficult or impossible to control the shape and cross-section of the resultant article to desired tolerances and within certain materials the cells tend to break into each other to produce a porous product. In accordance with my invention, the finely divided uniformly distributed blowing agent produces a multitude of small closed cells filled with gas which is ordinarily maintained under some degree of pressure by the stretched cell walls. A realtively firm resilient foam may thus be produced, depending in part upon the amount of blowing agent employed, having desirable characteristics for many purposes. It is, of course, important that any plasticizers utilized be of a type compatible and unreactive with the other ingredients of the material.

It will be seen from the foregoing that we compound together a fluoroelastomer, an acid acceptor, a bifunctional cross-linking agent, a cross-linking peroxide, and a blowing agent to produce the compound which we then form, cure and blow. Plasticizers and fillers are not always essential but are normally employed. A preferred fluoroelastomer is hexafluoropropylene-vinylidene fluoride copolymer; the preferred acid acceptor is magnesium oxide; the preferred bifunctional cross-linking agent is trimethylol propane trimethacrylate; the preferred cross-linking peroxide is benzoyl peroxide; and the preferred blowing agent is p,p'-oxybis (benzenesulfonyl-hydrazide). Any filler employed should be inert to the peroxide (carbon is not suitable), and the preferred plasticizer is a polymer of trifluorovinyl chloride (a halogenated fluid having a boiling point above 300° F.). The resultant cellular product has high resistance both to heat and to hydrocarbon fuels and the like. It also resists the action of acids. Accordingly, it is especially useful as high temperature packing material, heat insulation, sound damping material, and a variety of seals.

The relatively inert fluoroelastomers may safely be mixed with the organic peroxide having a decomposition temperature below 220° F. selected from the class consisting of benzoyl peroxide, lauroyl peroxide, methyl ethyl ketone peroxide, and 2,2-bis-t-butyl peroxybutane, in contrast to the situation under the circumstances disclosed in U.S. Patent 3,261,888, for example. A polyfunctional cross-linking agent is employed which is preferably a polyfunctional methacrylate monomer of the bis-vinylidene type, trimethylol propane trimethacrylate being much preferred. Other suitable examples are:

ethylene diacrylate
trimethylene diacrylate
tetramethylene diacrylate
pentamethylene diacrylate
hexamethylene diacrylate
cyclohexylidene diacrylate
bis-acrylate of diethylene glycol
bis-acrylate of triethylene glycol
bis-acrylate of propylene glycol
bis-acrylate of dipropylene glycol
1,4-butane dimethacrylate
1,3-butane dimethacrylate
1,3-propylene-2,2-dimethyl dimethacrylate
bis-methacrylate of ethylene glycol
bis-methacrylate of propylene glycol
bis-methacrylate of diethylene glycol
bis-methacrylate of triethylene glycol
bis-methacrylate of tetra-ethylene glycol
bis-methacrylate of polyethylene glycol
trimethylene dimethacrylate
pentamethylene dimethacrylate
hexamethylene dimethacrylate
trimethylol propane trimethacrylate
allyl acrylate
allyl methacrylate
acrylic ester of allycarbinol
methacrylic ester of allylcarbinol The plasticizer must be compatible and a halogenated organic fluid having a boiling point above 300° F. is employed (above the blowing temperature). Chlorinated or preferably fluorinated oils are preferred which are non-reactive with the peroxide cure system as well as being non-extractable in the cure media and non-volatile at the relatively high temperatures of 400° F. to 500° F. The fillers employed should also be inert to the action of the peroxides at the temperatures encountered. The acid acceptor takes up hydrogen fluoride or free fluorine produced during the cross-linking reaction and is accordingly an important constituent. The basic metallic oxides are employed for this purpose, with magnesium oxide being preferred.

When the extruded or otherwise molded article is heated the surface skin is initially cured to a resiliently distensible condition and the cure then progresses toward the center of the article. As above indicated, the article may be thus cured throughout its cross-section and then transferred to a bath or oven where it is heated to a considerably higher temperature which activates the blowing agent producing closed cells and distending the article. Alternatively, such uncured article may initially be subjected to a temperature sufficiently high to activate the blowing agent but due to such progressive heating of the article from its surface toward the center thereof the cure is at least partially effected in any portion of the article before the blowing agent is activated in such portion; accordingly, the central portion of the article is then the last to be cured and blown. If the article is at all sizable, the outer skin will be cured and the region directly therebeneath cured and blown before the centrally inner region is either cured or blown. Such skin will therefore ordinarily be somewhat stretched or distended when the cure and blow have been completed. The fluoroelastomers are not deleteriously effected by the indicated low temperature curing agents as are certain other types of elastomeric compositions.

It has been found that when the molded part is reasonably symmetrical in shape it can be cured and blown in the open in accordance with the invention to produce a cellular article which retains the proportions of the original part on an enlarged scale. Cell size may vary but the cell diameters are usually on the order of .003 inch to .010 inch. By ASTM testing methods, it is determined that substantially all the cells are of the closed type, producing a generally non-porous structure. The substantially imperforate surface skin is usually quite thin.

Expansion of the article is ordinarily substantially complete when the cure is approximately 75% complete, and it is desirable thereafter to post-cure at about 300° F. for one hour to mature the properties and complete the cure. It is ordinarily desired that the blowing agent be capable of activation at a temperature which is not so much higher than the effective curing temperature that the article (or portion thereof) will be completely cured prior to blowing. In fact, the blow and cure will normally overlap, but with the cure beginning preliminarily of the blow and continuing during the latter; the blow lags the cure.

While the well-known nitrogen-producing blowing agents are preferred for employment in accordance with this invention, the carbon dioxide producing agents such as sodium bicarbonate may instead be utilized. However, such sodium bicarbonate will normally commence giving off a certain amount of carbon dioxide somewhat prematurely (i.e. before the curing process has progressed to the desired degree), and the cellular product is of lower quality, although cell production continues following substantial cure.

The embodiments of the invention in which an exclusive property or privilege is claimed are defined as follows:

1. The method of producing a cellular fluoroelastomeric article which comprises incorporating a blowing agent, a polyfunctional methacrylate cross-linking agent and an organic peroxide having a decomposition temperature below 220° F. in the uncured fluoroelastomer selected from the group consisting of hexafluoropropylene-vinylidene fluoride copolymers, chlorotrifluoroethylene-vinylidene fluoride copolymers and fluorosilicone, the blowing agent, methacrylate and peroxide having no substantial deleterious effect on such particular elastomeric material, and the blowing agent being activated only at a temperature substantially higher than that effective to activate the peroxide, producing a preformed article therefrom, heating such article to a temperature high enough to at least partially cure the article without appreciable blowing thereof, and further heating the article in unconstricted condition to a higher temperature effective to activate the blowing agent to produce a multitude of small cells therein.

2. The method of claim 1 wherein the peroxide is benzoyl peroxide.

3. The method of claim 2, wherein trimethylol propane trimethacrylate is employed as the cross-linking agent, a polymer of trifluorovinyl chloride is employed as the plasticizer, and p,p'-oxybis (benzenesulfonyl-hydrazide) is employed as the blowing agent.

4. The method of claim 3, wherein a filler is included which is inert to the other ingredients.

5. The method of claim 1 wherein the peroxide is selected from the class consisting of benzoyl peroxide, lauroyl peroxide, methyl ethyl ketone peroxide, a 2,2-bis-t-butyl peroxybutane, and a plasticizer is included which is a halogenated organic oil which is non-reactive to the foregoing ingredients.

6. The method of claim 5 wherein an acid acceptor is included in the composition.

7. The method of claim 6, wherein the acid acceptor is a basic metallic oxide.

8. The method of claim 6, wherein the acid acceptor is magnesium oxide.

9. The method of claim 6, wherein the pre-formed article is subjected to external heat at a temperature sufficiently high to activate the blowing agent, thereby progressively first curing and thereafter blowing the article from the outer surface to the center thereof.

10. The method of claim 9 wherein the first curing is accomplished by passing the pre-formed article through a heated liquid-curing media.

11. A composition adapted to be cured and blown to form an elastomeric article containing a multitude of closed cells comprising 100 parts by weight of an uncured fluoroelastomer, selected from the group consisting of hexafluoropropylene-vinylidene fluoride copolymers and chlorotrifluoroethylene-vinylidene chloride copolymers, 10–20 parts by weight of an acid acceptor, 1–20 parts by weight of a bi-functional methacrylate cross-linking agent, 2–7 parts by weight of a cross-linking peroxide having a decomposition temperature below 220° F., and 0.5–4 parts by weight of a blowing agent activated at a substantially higher temperature than the temperature effective to activate such cross-linking agent and peroxide.

12. The composition of claim 11, also including up to 50 parts by weight of an inert filler, and 5–25 parts by weight of a halogenated oil plasticizer.

References Cited

UNITED STATES PATENTS

| 3,142,660 | 7/1964 | Conger | 260—2.5 R |
|---|---|---|---|
| 2,944,995 | 7/1960 | Dosmann et al. | 260—87.7 |
| 3,575,897 | 4/1971 | Port | 260—2.5 R |

FOREIGN PATENTS

| 667,979 | 8/1963 | Canada | 260—2.5 HA |

WILBERT J. BRIGGS, Sr., Primary Examiner

U.S. Cl. X.R.

260—2.5 R, 2.5 P, 33.8 F, 33.8 SB, 46.5 G, 87.7 96 R, 827, 899; 264—54, 178, 184